US005396557A

United States Patent [19]

Tonci

[11] Patent Number: 5,396,557

[45] Date of Patent: Mar. 7, 1995

[54] HYGIENIC TELEPHONE PAD AND DISPENSER APPARATUS

[76] Inventor: Matulina Tonci, Andrije Hebranga 5, 57000 Zadar, Croatia

[21] Appl. No.: 108,233

[22] Filed: Aug. 19, 1993

[51] Int. Cl.[6] .............. H04M 1/00

[52] U.S. Cl. .............. 379/452; 379/437

[58] Field of Search .............. 379/452, 451, 439

[56] References Cited

U.S. PATENT DOCUMENTS 860,025 7/1907 Grimm .............. 379/452

4,819,264 4/1989 Lemley .............. 379/452

FOREIGN PATENT DOCUMENTS 22593 1/1906 Germany .............. 379/439

257585 3/1928 Italy .............. 379/452

*Primary Examiner*—James L. Dwyer
*Assistant Examiner*—Jack Chiang
*Attorney, Agent, or Firm*—Hugh E. Smith

[57] ABSTRACT

A disposable sanitary pad and associated dispenser for covering portions of a telephone handset to protect a user from contact with those portions. The pads are contained within a dispenser assembly and are attachable to both the mouthpiece and the earpiece of the telephone handset by hook and pile fasteners. The dispenser allows a simultaneous placement of a pair of pads to the handset from an underlying supply of the same and includes a desiccant assembly for maintaining the pads in a dry condition.

8 Claims, 4 Drawing Sheets

HYGIENIC TELEPHONE PAD AND DISPENSER APPARATUS

BACKGROUND OF THE INVENTION

1. Field of the Invention

The present invention relates to sanitary covers and more particularly pertains to disposable sanitary pads which may be utilized for covering portions of a telephone handset to protect a user from contact with those portions.

2. Description of the Prior Art

The use of sanitary covers is known in the prior art. More specifically, sanitary covers heretofore devised and utilized for the purpose of covering portions of a telephone handset are known to consist basically of familiar, expected and obvious structural configurations, notwithstanding the myriad of designs encompassed by the crowded prior art which have been developed for the fulfillment of countless objectives and requirements.

For example, a sanitary telephone cover is illustrated in U.S. Pat. No. 5,054,063 which includes a disposable sanitary telephone cover attachable to the sound transmitting portions of a telephone for protecting a user from contacting the sound transmitting portions of the telephone and being exposed to bacteria and other contagious and infectious agents carried by the telephone. The telephone cover comprises a disposable sheet including a number of layers of material bonded together which may be attached to a telephone through a use of an adhesive.

A telephone sanitary cover is described in U.S. Pat. No. 4,546,217 which utilizes an inexpensive, disposable sanitary cover for telephones comprising a sleeve-like member adapted to receive and retain a telephone handset. The invention also includes a generally conformable base-encasing member adapted to encase and seal a telephone base member from direct contact therewith by a user.

Another patent of interest is U.S. Pat. No. 4,852,163 which describes a telephone mouthpiece cover including a single piece of frustocircular paperboard which is formed in such a manner so as to define a cap portion and a skirt portion adapted to fit snugly on standard telephone receivers. The cover is designed to be completely disposable and includes a plurality of annular ribs for reinforcement of the skirt portion.

While these devices fulfill their respective, particular objectives and requirements, the aforementioned patents do not describe a hygienic telephone pad and dispenser apparatus having a plurality of disposable sanitary pads contained within a dispenser assembly and attachable to both the mouthpiece and the earpiece of a telephone handset by hook and pile fasteners. In this respect, the hygienic telephone pad and dispenser apparatus according to the present invention substantially departs from the conventional concepts and designs of the prior art, and in so doing provides an apparatus primarily developed for the purpose of covering portions of a telephone handset to protect a user from contact with those portions.

SUMMARY OF THE INVENTION

In view of the foregoing disadvantages inherent in the known types of sanitary covers now present in the prior art, the present invention provides a new hygienic telephone pad and dispenser apparatus construction wherein the same can be utilized for covering portions of a telephone handset to protect a user from contact with those portions. As such, the general purpose of the present invention, which will be described subsequently in greater detail, is to provide a new hygienic telephone pad and dispenser apparatus which has many of the advantages of the sanitary covers mentioned heretofore and many novel features that result in a hygienic telephone pad and dispenser apparatus which is not anticipated, rendered obvious, suggested, or even implied by any of the prior art sanitary covers, either alone or in any combination thereof.

To attain this, the present invention essentially comprises a disposable sanitary pad and associated dispenser for covering portions of a telephone handset to protect a user from contact with those portions. The pads are contained within a dispenser assembly and are attachable to both the mouthpiece and the earpiece of the telephone handset by hook and pile fasteners. The dispenser allows a simultaneous placement of a pair of pads to the handset from an underlying supply of the same and includes a desiccant assembly for maintaining the pads in a dry condition.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hygienic telephone pad and dispenser apparatus which has many of the advantages of the sanitary covers mentioned heretofore and many novel features that result in a hygienic telephone pad and dispenser apparatus which is not anticipated, rendered obvious, suggested, or even implied by any of the prior art sanitary covers, either alone or in any combination thereof.

It is another object of the present invention to provide a new hygienic telephone pad and dispenser apparatus which may be easily and efficiently manufactured and marketed.

It is a further object of the present invention to provide a new hygienic telephone pad and dispenser apparatus which is of a durable and reliable construction.

An even further object of the present invention is to provide a new hygienic telephone pad and dispenser apparatus which is susceptible of a low cost of manufacture with regard to both materials and labor, and which accordingly is then susceptible of low prices of sale to the consuming public, thereby making such hygienic telephone pad and dispenser apparatuses economically available to the buying public.

Still yet another object of the present invention is to provide a new hygienic telephone pad and dispenser apparatus which provides in the apparatuses and methods of the prior art some of the advantages thereof, while simultaneously overcoming some of the disadvantages normally associated therewith.

Still another object of the present invention is to provide a new hygienic telephone pad and dispenser apparatus including disposable sanitary pads which may be attached to both the mouthpiece and the earpiece of a telephone handset to protect a user from contact therewith.

Yet another object of the present invention is to provide a new hygienic telephone pad and dispenser apparatus providing disposable sanitary pads which may be selectively secured to a telephone handset by hook and pile fasteners.

Even still another object of the present invention is to provide a new hygienic telephone pad and dispenser apparatus which includes a desiccant assembly for maintaining a plurality of disposable sanitary pads in a dry condition.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
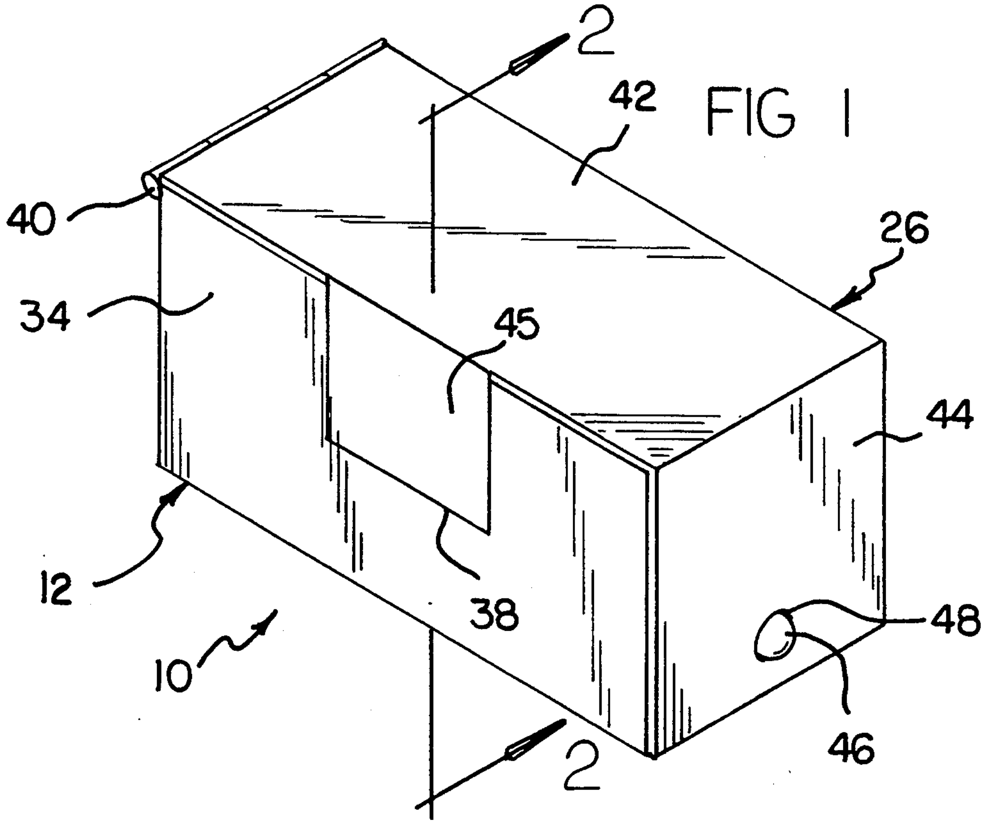
FIG. 1 is a perspective view of a first embodiment of a hygienic telephone pad and dispenser apparatus comprising the present invention.

With reference now to the drawings, and in particular to FIGS. 1–5 thereof, a new hygienic telephone pad and dispenser apparatus embodying the principles and concepts of the present invention and generally designated by the reference numeral 10 will be described.

The hygienic telephone pad and dispenser apparatus 10 comprises an enclosure 12 which supports and encloses a pair of dispenser assemblies 14. Each of the dispenser assemblies 14 contains a supply of disposable hygienic pads 16 which may be individually secured to the sound transmitting portions 17 of a telephone handset 18 through a use of hook and pile fasteners 20 which are located on both the handset and the hygienic pads. The dispenser assemblies 14 are both slidably supported upon a pair of tracks 22, 24 which facilitate an adjustment thereof to accommodate various sizes of telephone handsets. The enclosure 12 is completed with a cover assembly 26 which is operable to fully enclose the dispenser assemblies 14 to substantially shield the same from exterior elements such as rain, wind, dirt and the like.

In use, the hygienic telephone pad and dispenser apparatus 10 may be positioned proximate any telephone, particularly public telephones, to provide a supply of the hygienic pads 16 for application to the handset 18 of the telephone. The device 10 may be operated by releasing the cover assembly 26 to expose the dispenser assemblies 14 within the enclosure 12. The telephone handset 18 may then be placed within the enclosure 12, whereby the sound transmitting portions 17 of the handset engage the dispenser assemblies 14 and the associated hygienic pads 16 contained therewithin. The hygienic pads 16 are provided with a fastening means, such as either hook and pile fasteners 20 engagable to companion hook and pile fasteners 20 secured to the telephone handset 18 or an adhesive, to facilitate a removable coupling between the two. Upon placement of the telephone handset 18 within the dispenser assemblies 14, the telephone handset may be manipulated in such a manner so as to cause a tearing of the perforations 28, thereby releasing the upper most hygienic pads 16 from the dispenser assemblies.

The hygienic pads 16 are comprised of any substantially sound transparent material which provides an effective barrier between a user and the covered portions of the telephone handset 18 to prevent a transmission of germs, bacteria, and the like therethrough. The hygienic telephone pad and dispenser apparatus 10 provides a convenient means for dispensing such hygienic pads 16 to public telephone users.

Figure 2:
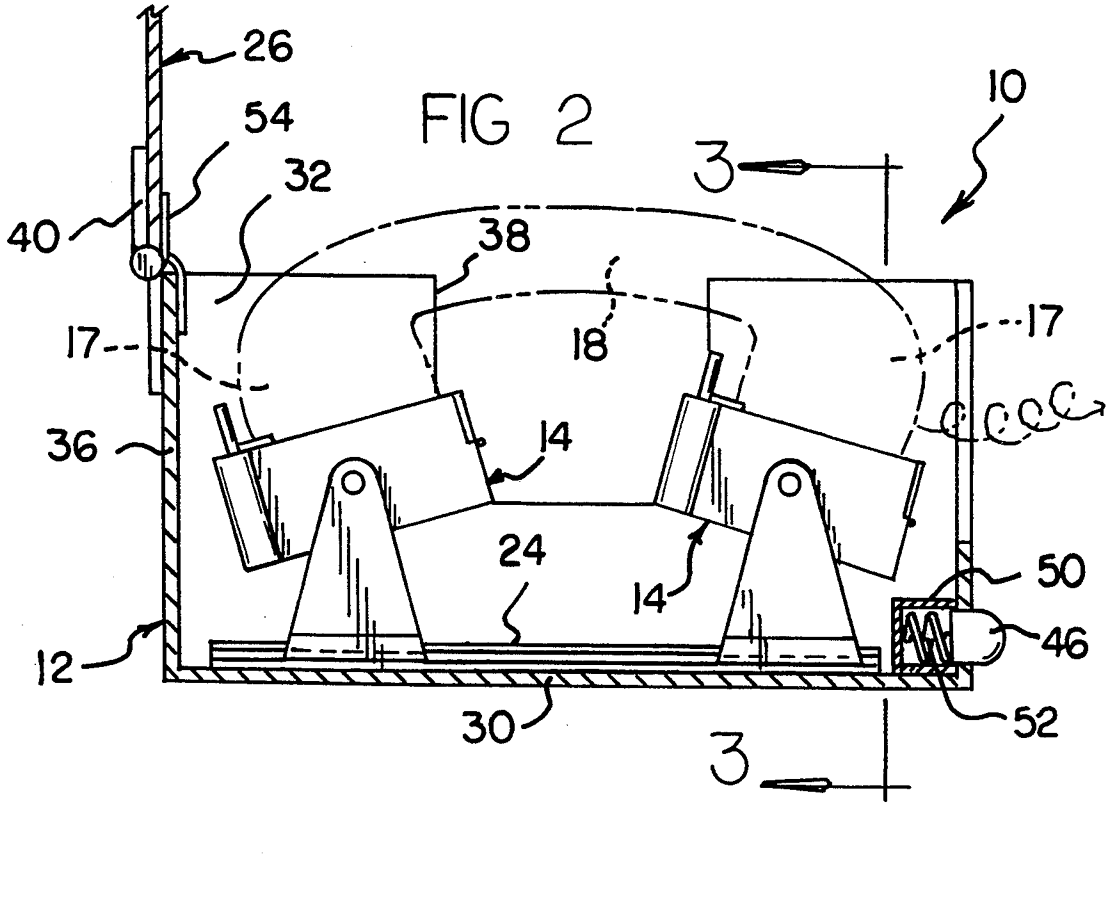
FIG. 2 is a cross sectional view taken along line 2—2 of FIG. 1.

More specifically, it will be noted that the hygienic telephone pad and dispenser apparatus 10 comprises an enclosure 12 having a bottom wall 30 from which a pair of spaced, co-planar sidewalls 32, 34 orthogonally project. A rear wall 36 is orthogonally connected to the bottom wall 30, and both of the sidewalls 32, 34, as best illustrated in FIG. 2. The sidewalls 32, 34 each include cutout portions 38, such as is shown for sidewall 34 in FIG. 1, proximate a top, medial portion thereof which allow for easier manipulation of a telephone handset 18 within the enclosure 12 by a user.

Pivotally connected by a hinge 40 to the enclosure 12 is a cover assembly 26. The cover assembly 26 is comprised of a top wall 42 having a substantially similar shape to that of the bottom wall 30 being orthogonally connected to a front wall 44 which has a substantially similar shape as that of the rear wall 36. The cover assembly further includes a pair of fill portions 45, only one of which is shown in FIG. 1, which are operable to fit within the cutout portions 38 of the sidewalls 32, 34 when the cover assembly 26 is in a closed position.

The cover assembly 26 is removably secured in a closed position by a release button 46 which projects through a button aperture 48 in the front wall 44 thereof. The release button 46 is contained within a button cavity 50 upon a button spring 52 which biases the release button outwardly therefrom. Upon an actuation of the release button 46 by a user, the cover assembly 26 will be biased into an open position by a torsion spring 54 which is operatively coupled to the hinge 40, as best illustrated in FIG. 2.

Figure 3:
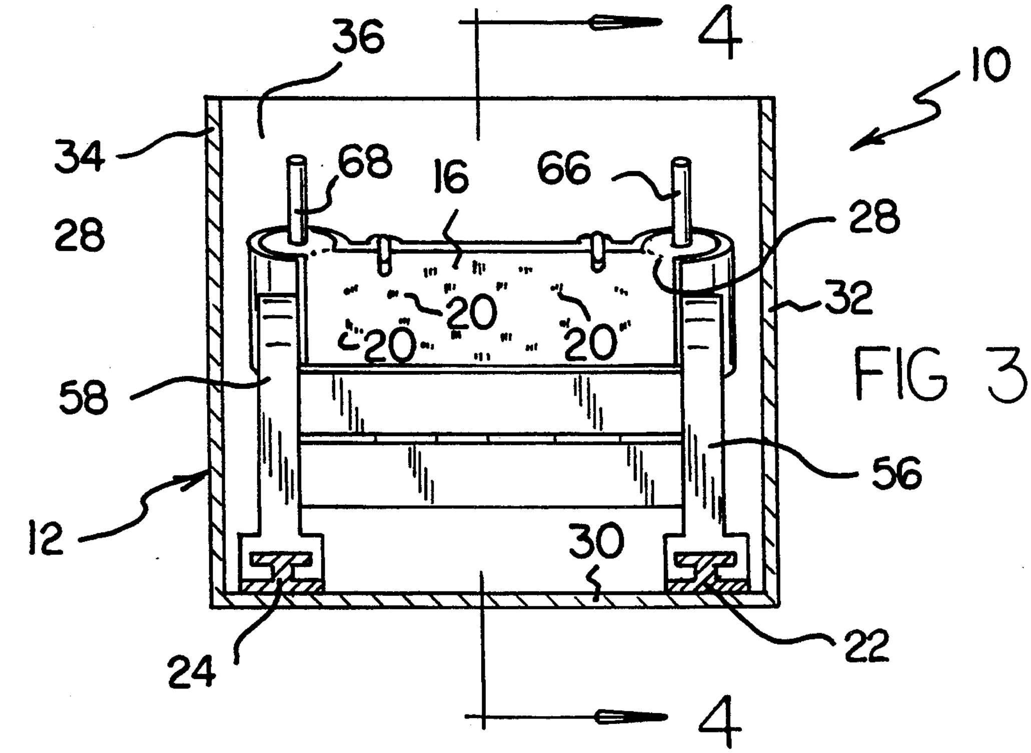
FIG. 3 is a cross sectional view taken along line 3—3 of FIG. 2.
Figure 4:
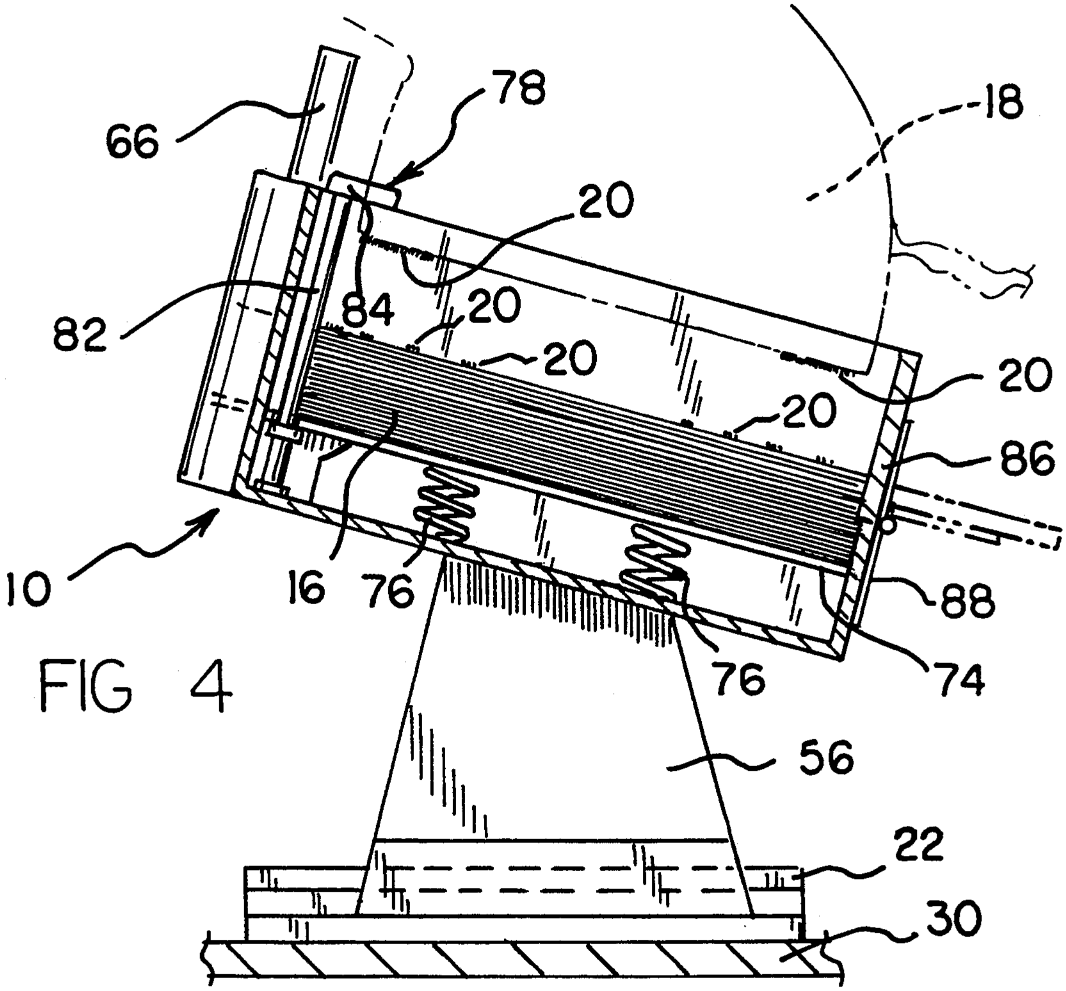
FIG. 4 is a cross sectional view taken along line 4—4 of FIG. 3.

A pair of tracks 22, 24 are fixedly secured to an interior of the closure 12 upon the bottom wall 30 thereof. The tracks 22, 24 engage and slidably secure a pair of supports 56, 58 in a perpendicular manner with respect to the bottom wall 30, as best illustrated in FIG. 3. The supports 56, 58 rotatably support a dispenser assembly 14 upon a pair of unlabeled pivot pins to allow the dispenser assembly to pivot to an appropriate angle such that the hygienic pads 16 contained therein may be positioned flatly against the sound transmitting portion 17 of the telephone handset 18, as best illustrated in FIG. 4.

Figure 5:
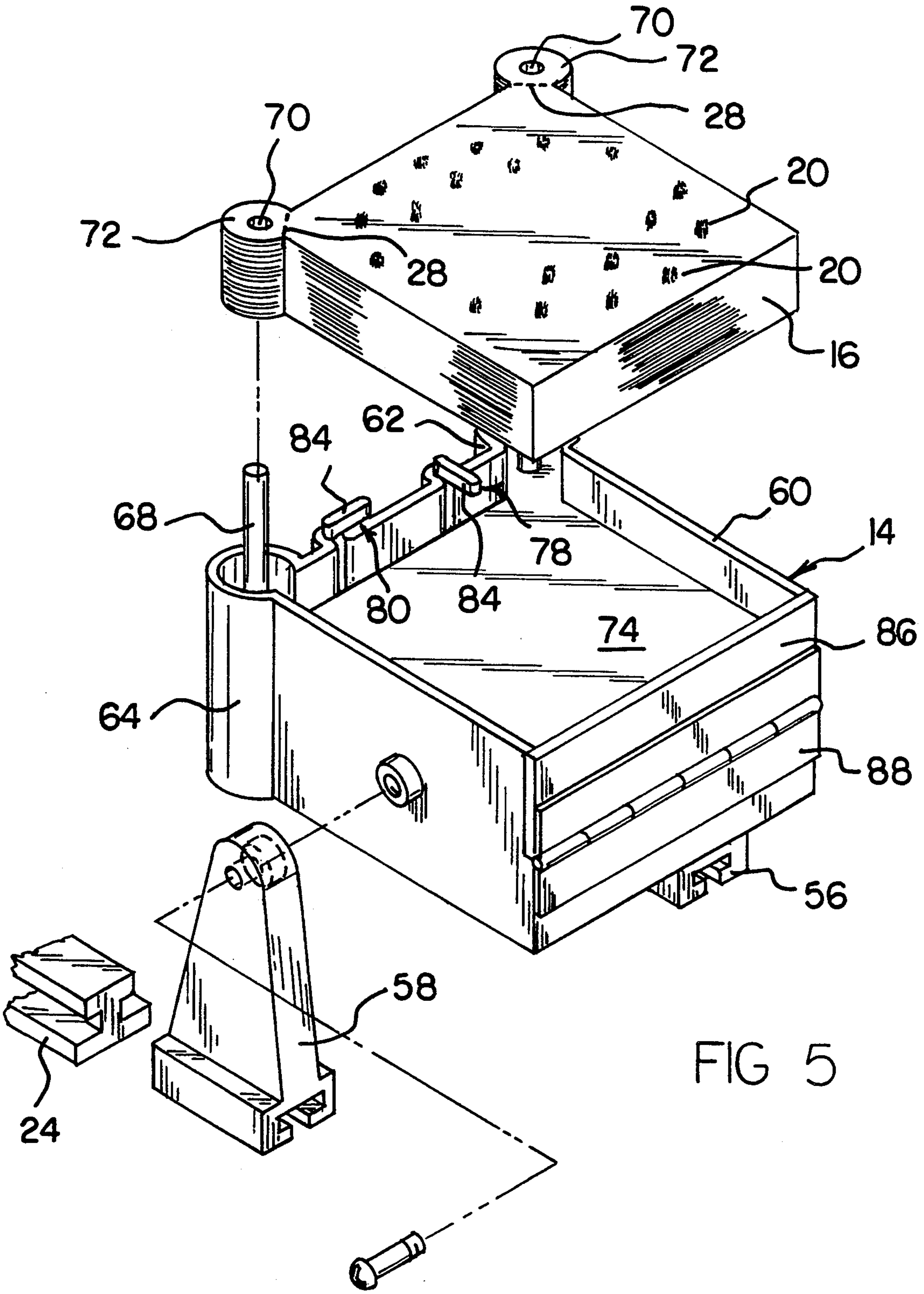
FIG. 5 is an exploded perspective view of the first embodiment of the present invention.

Although the hygienic telephone pad and dispenser apparatus 10 comprises two dispenser assemblies 14, each of the dispenser assemblies is substantially similar in shape and therefore only one will be described in detail. FIG. 5 shows an exploded view of one of the dispenser assemblies 14 and it can be shown from this illustration that the dispenser assembly is comprised of a dispenser body 60 having a substantially square shape and including a pair of vertical cylinders 62, 64 integrally formed into a pair of corners thereof. The vertical cylinders 62, 64 each have a guide rod 66, 68 disposed in a concentric manner therewithin. The guide rods 66, 68 are operable to project through apertures 70 in circular ear portions 72 of the hygienic pads 16 to secure a position thereof within the dispenser body 60.

The hygienic pads 16 are supported upon a pad support member 74 within the dispenser body 60. The pad support member 74 is coupled to the dispenser body 60 and supported relative thereto by a plurality of support springs 76, as best illustrated in FIG. 4. The hygienic pads 16 are further retained within the dispenser body by a pair of pad retainer assemblies 78, 80 which are rotatably coupled to the dispenser body 60 and are each comprised of a pivot rod 82 having a keeper 84 at a top portion thereof to preclude an accidental removal of the hygienic pads 16.

An access door 86 is pivotally coupled to the dispenser body 60 by a spring loaded hinge 88 which allows access to a vertical side of a stack of the hygienic pads 16 contained therewithin. The access door 86 also allows the telephone handset 18, after being engaged to a hygienic pad 16, to exit outwardly through the access door while simultaneously tearing the perforations 28 of the hygienic pad, thereby freeing the same from a stack of such pads.

In use, the hygienic telephone pad and dispenser apparatus 10 may either be positioned proximate any telephone, particularly public telephones, or portably carried by the user to provide a supply of the hygienic pads 16 for application to the handset 18 of the telephone. The device 10 may be operated by releasing the cover assembly 26 and placing the telephone handset 18 within the enclosure 12, whereby the sound transmitting portions 17 of the handset engage the dispenser assemblies 14 and the associated hygienic pads 16 contained therewithin. The telephone handset may then be manipulated in such a manner so as to cause a tearing of the perforations 28, thereby releasing the upper most hygienic pads 16 from the dispenser assemblies 14. The hygienic pads 16 may be formed of any substantially sound transparent material, such as a cellophane, cloth, paper and the like, which provides an effective barrier between a user and the covered portions of the telephone handset 18 to prevent a transmission of germs and bacteria therethrough.

Figure 6:
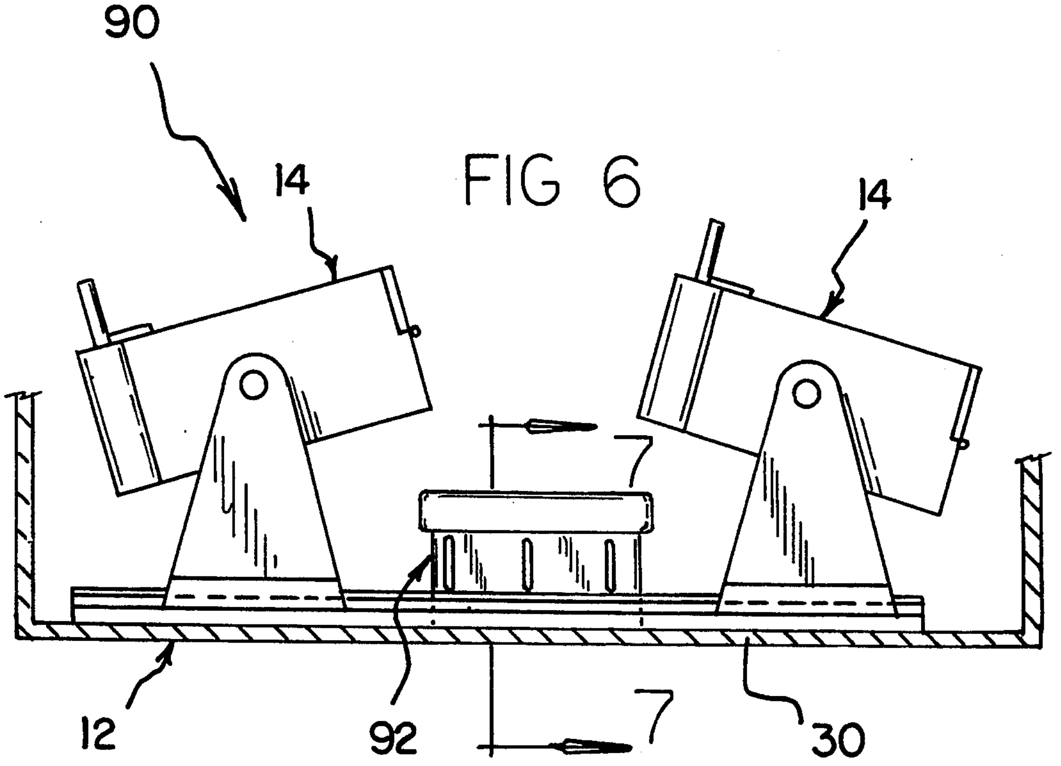
FIG. 6 is a side elevation view, partially in cross section, of a second embodiment of a hygienic telephone pad and dispenser apparatus comprising the present invention.
Figure 7:
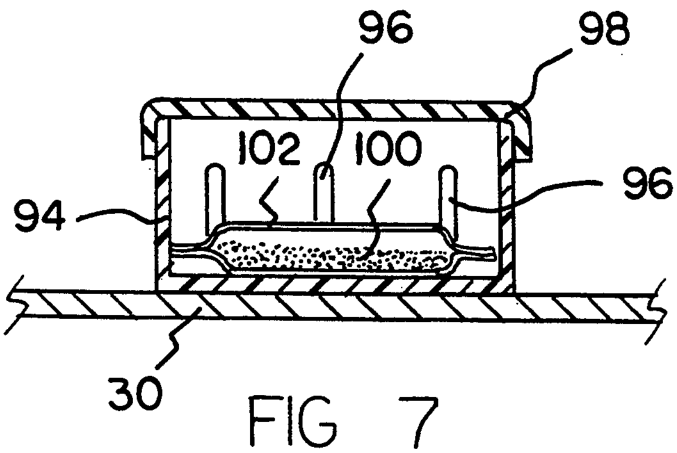
FIG. 7 is a cross sectional view taken along line 7—7 of FIG. 6.

A second embodiment of the present invention as generally designated by the reference numeral 90, which comprises substantially all of the features of the foregoing embodiment 10 and which further comprises a desiccant assembly 92 will now be described. As best shown in FIGS. 6–7, it can be shown that the desiccant assembly 92 comprises a cylindrical desiccant body 94 secured to the bottom wall 30 of the enclosure 12 in an area substantially between the dispenser assemblies 14. The desiccant body 94 includes a plurality of air apertures 96 therethrough and a cap 98 removably coupled thereto. Desiccant material 100, such as water absorbing salts, gels, and the like, is contained within an envelope 102 and removably positioned within the desiccant body 94. The desiccant assembly 92 is operable to substantially dehydrate the air within the enclosure 12, thereby maintaining the pads 16 in a dry condition.

As to a further discussion of the manner of usage and operation of the present invention, the same should be apparent from the above description. Accordingly, no further discussion relating to the manner of usage and operation will be provided.

In summary, the hygienic telephone pad and dispenser apparatus provides a convenient way for a user to cover portions of a public telephone to protect the user from contact with those portions and being exposed to bacteria and other contagious or infectious agents present thereon. The apparatus may be securely mounted to public telephone booths so that all users of the public telephone may enjoy these benefits.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hygienic telephone pad and dispenser apparatus for use with a telephone handset, said apparatus comprising:

a first plurality of hygienic pads stacked one on top of another, each of said pads having an ear portion with an aperture directed through said ear portion and perforations permitting a tearing separation of said ear portion from said first pads;

a first fastening means comprising a first hook fastener and a first loop fastener, said first hook fastener coupled to a top surface of each of said first plurality of pads, and said first loop fastener coupled to a first portion of said telephone handset; and, a first dispenser assembly for receiving and supporting said first plurality of hygienic pads, said first dispenser assembly comprising a first dispenser body within which said first hygienic pads are received, said first dispenser body being operable to receive said first portion of said telephone handset at least partially therewithin, said first dispenser assembly further comprising a first guide rod directed through said aperture in said ear portion of said first pads, wherein said first loop fastener of the first portion of said telephone handset is positionable into contact with one of said first hook fastener of said first hygienic pads to couple said first hygienic pad to said first handset portion, whereby said handset is slidably removed from said first dispenser body to effect a tearing of said perforations and a separation of said one hygienic pad from a remainder of said first plurality of said hygienic pads.

2. The hygienic telephone pad and dispenser apparatus of claim 1, wherein said first fastening means comprises hook and pile fasteners secured to said top surface of each of said first pads.

3. The hygienic telephone pad and dispenser apparatus of claim 2, and further comprising an enclosure having a bottom wall and a pivotally mounted cover secured to said enclosure, wherein said first dispensing assembly is pivotally mounted to said bottom wall of said enclosure.

4. The hygienic telephone pad and dispenser apparatus of claim 3, and further comprising a second plurality of hygienic pads stacked one on top of another, each of said second pads having an ear portion with an aperture directed through said ear portion and perforations permitting a tearing separation of said ear portion from said second pads; a second fastening means comprising a second hook fastener and a second loop fastener, said second hook fastener coupled to a top surface of each of said second plurality of pads, and said second loop fastener coupled to a second portion of said telephone handset; a second dispenser assembly for receiving and supporting said second plurality of hygienic pads, said second dispenser assembly comprising a second dispenser body within which said second hygienic pads are received, said second dispenser body being operable to receive said second portion of said telephone handset at least partially therewithin, said second dispenser assembly further comprising a second guide rod directed through said aperture in said ear portion of said second pads, wherein said second loop fastener of the second handset is positionable into contact with one of said second hook fastener of said second hygienic pads to couple said second hygienic pad to said second handset portion, whereby said handset is slidably removed from said second dispenser body to effect a tearing of said perforations and a separation of said one hygienic pad from a remainder of said second plurality of said hygienic pads, wherein said second dispensing assembly is pivotally mounted to said bottom wall of said enclosure and spaced from said first dispenser assembly such that one of said first plurality of pads is coupled to said first portion of said telephone handset and one of said second plurality of pads is coupled to said second portion of said telephone handset simultaneously.

5. The hygienic telephone pad and dispenser apparatus of claim 4, and further comprising a pair of tracks fixedly secured to an interior surface of said bottom wall, and a plurality of supports slidably engaged to said tracks, each of said supports being rotatably coupled to an individual one of said first and second dispenser assemblies.

6. A hygienic telephone pad and dispenser apparatus for use with a telephone handset, said apparatus comprising:

an enclosure having a bottom wall and a pivotally mounted cover secured to said enclosure, said enclosure having a pair of tracks fixedly secured to an interior surface of said bottom wall;

a first plurality of hygienic pads stacked one on top of another, each of said pads having an ear portion with an aperture directed through said ear portion and perforations permitting a tearing separation of said ear portion from said first pads;

a first fastening means comprising a first hook fastener and a first loop fastener, said first hook fastener coupled to a top surface of each of said first plurality of pads, and said first loop fastener coupled to a first portion of said telephone handset;

a first pair of supports slidably mounted to said tracks;

a first dispenser assembly for receiving and supporting said first plurality of hygienic pads, said first dispenser assembly being pivotally mounted between said first pair of supports and comprising a first dispenser body within which said first hygienic pads are received, said first dispenser body being operable to receive said first portion of said telephone handset at least partially therewithin, said first dispenser assembly further comprising a first guide rod directed through said aperture in said ear portion of said, first pads wherein said first loop fastener of the first portion of said telephone handset is positionable into contact with one of said first hook fastener of said first hygienic pads to couple said first hygienic pad to said first handset portion, whereby said handset is slidably removed from said first dispenser body to effect a tearing of said perforations and a separation of said one hygienic pad from a remainder of said first plurality of said hygienic pads, said first dispensing assembly being pivotally mounted to said bottom wall of said enclosure;

a second plurality of hygienic pads stacked one on top of another, each of said pads having an ear portion with an aperture directed through said ear portion and perforation permitting a tearing separation of said ear portion from said second pads;

a second fastening means comprising a second hook fastener and a second loop fastener, said second hook fastener coupled to a top surface of each of said second plurality of pads, and said second loop fastener coupled to a second portion of said telephone handset;

a second pair of supports slidably mounted to said tracks;

a second dispenser assembly for receiving and supporting said second plurality of hygienic pads, said second dispenser assembly being pivotally mounted between said second pair of supports and comprising a second dispenser body within which said second hygienic pads are received, said second dispenser body being operable to receive said second portion of said telephone handset at least partially therewithin, said second dispenser assembly further comprising a second guide rod directed through said aperture in said ear portion of said second pads, wherein said second loop fastener of the second portion of said telephone handset is positionable into contact with one of said second hook fastener of said second hygienic pads to couple said second hygienic pad to said second handset portion, whereby said handset is slidably removed from said second dispenser body to effect a tearing of said perforations and a separation of said one hygienic pad from a remainder of said second plurality of said hygienic pads, wherein said second dispensing assembly is pivotally mounted to said bottom wall of said enclosure and spaced from said first dispenser assembly such that one of said first plurality of pads is coupled to said first portion of said telephone handset and one of said second plurality of pads is coupled to said second portion of said telephone handset simultaneously.

7. The hygienic telephone pad and dispenser apparatus of claim 6, wherein said fastening means comprises hook and pile fasteners secured to said top surface of each of said first and second pads.

8. The hygienic telephone pad and dispenser apparatus of claim 7, wherein each of said dispenser bodies includes a pad support member movably mounted within the dispenser body on top of a plurality of springs.

* * * * *